United States Patent
Chandra et al.

(10) Patent No.: US 8,892,077 B2
(45) Date of Patent: Nov. 18, 2014

(54) METHOD AND APPARATUS FOR PROVIDING MULTIMEDIA CONTENT ON A MOBILE MEDIA CENTER

(75) Inventors: Nalesh Chandra, Lincoln, CA (US); David Small, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 996 days.

(21) Appl. No.: 12/326,724

(22) Filed: Dec. 2, 2008

(65) Prior Publication Data
US 2010/0136958 A1 Jun. 3, 2010

(51) Int. Cl.
H04M 3/42 (2006.01)
H04W 8/24 (2009.01)
H04L 29/06 (2006.01)
H04N 21/462 (2011.01)
H04W 24/00 (2009.01)

(52) U.S. Cl.
CPC .......... *H04L 65/4084* (2013.01); *H04N 21/462* (2013.01); *H04W 24/00* (2013.01); *H04W 8/245* (2013.01); *H04N 21/4622* (2013.01)
USPC ..... 455/414.1; 455/418; 455/419; 455/414.3; 455/414.2; 725/87

(58) Field of Classification Search
CPC ........... H04W 4/00; H03W 8/18; H03W 8/22; H03W 8/24; H03W 8/20; H04N 21/462; H04N 21/4622; H04N 5/4401
USPC ........ 455/414.1, 41.2, 414.3, 414.2; 725/139, 725/110
See application file for complete search history.

(56) References Cited

U.S. PATENT DOCUMENTS

| 7,835,736 | B2 * | 11/2010 | Larocca | 455/432.3 |
|---|---|---|---|---|
| 2005/0010963 | A1 * | 1/2005 | Zeng et al. | 725/131 |
| 2008/0059998 | A1 * | 3/2008 | McClenny et al. | 725/33 |
| 2008/0280598 | A1 * | 11/2008 | Delegue et al. | 455/414.1 |
| 2009/0172757 | A1 * | 7/2009 | Aldrey et al. | 725/110 |
| 2010/0083338 | A1 * | 4/2010 | Chiang | 725/139 |

* cited by examiner

*Primary Examiner* — Khalid Shaheed

(57) ABSTRACT

A method and apparatus for providing multimedia content over a wireless network are disclosed. For example, the method receives a request from a customer via a data enabled cellular phone for accessing one or more multimedia content from a multimedia content server of the customer, and performs an authentication for obtaining the one or more multimedia content from the multimedia content server. The method obtains the one or more multimedia content from the multimedia content server, and transmits the one or more multimedia content to the data enabled cellular phone.

15 Claims, 4 Drawing Sheets

METHOD AND APPARATUS FOR PROVIDING MULTIMEDIA CONTENT ON A MOBILE MEDIA CENTER

The present invention relates generally to communication networks and, more particularly, to a method and apparatus for providing multimedia content on a mobile media center, wherein the multimedia is provided over a cellular network, or other wireless access networks.

BACKGROUND OF THE INVENTION

As Internet usage continues to grow, the desire to have access to multimedia content at all times also continues to grow. A user may wish to access media content, e.g., entertainment videos, at any location. As such, the user may bring the multimedia content along that can be played on a laptop or a portable player. However, the user's access is limited to the multimedia content that the user is carrying with him/her.

SUMMARY OF THE INVENTION

In one embodiment, the present invention discloses a method and apparatus for providing multimedia content over a wireless network. For example, the method receives a request from a customer via a data enabled cellular phone for accessing one or more multimedia content from a multimedia content server of the customer, and performs an authentication for obtaining the one or more multimedia content from the multimedia content server. The method obtains the one or more multimedia content from the multimedia content server, and transmits the one or more multimedia content to the data enabled cellular phone.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing multimedia content on a mobile media center. Although the present invention is discussed below in the context of multimedia content provided over a cellular network, the present invention is not so limited. Namely, the present invention can be applied for other types of wireless networks, e.g., a wireless local access network and the like.

Figure 1:
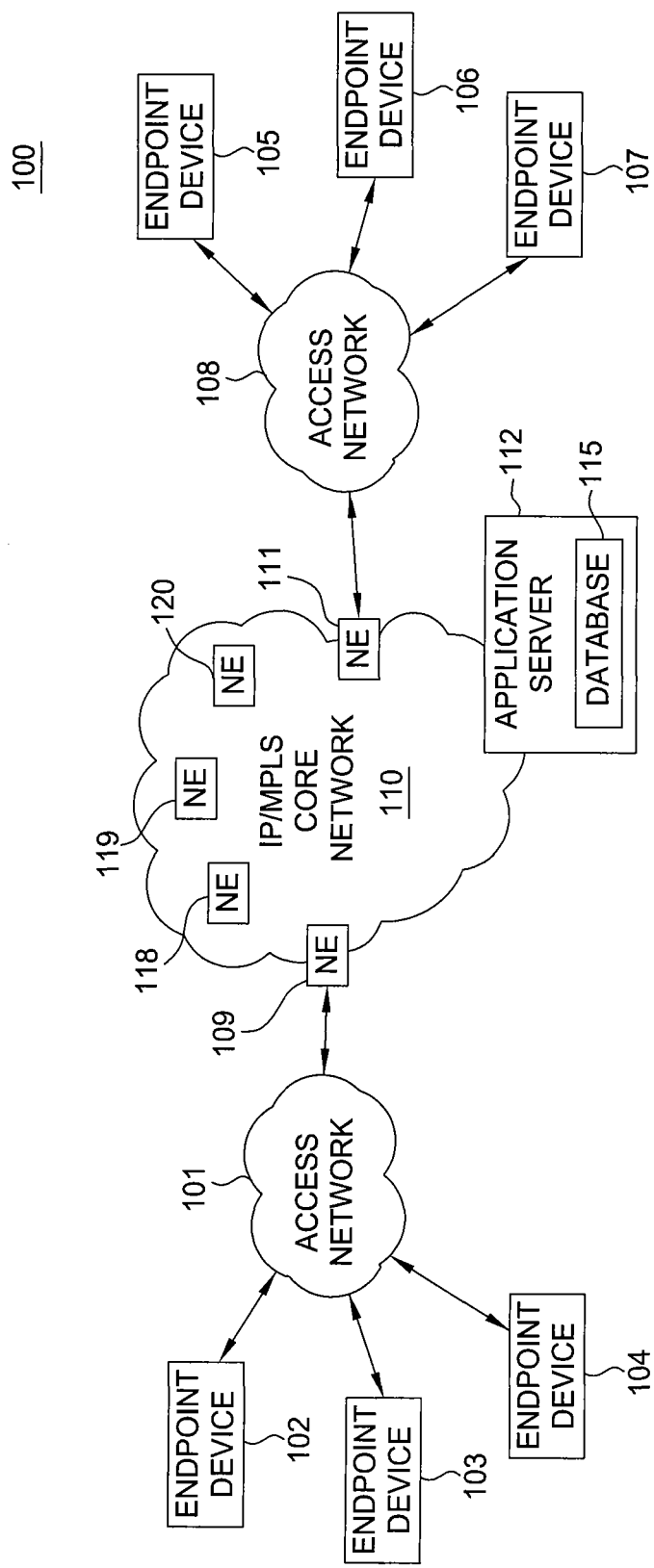
FIG. 1 illustrates an illustrative network related to the present invention.

FIG. 1 is a block diagram depicting an illustrative packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication network 100 may be expanded by including additional endpoint devices, access networks, network elements, and/or application servers, without altering the scope of the present invention. The above IP network is described to provide an illustrative environment in which packets for various services, e.g., voice, data and multimedia (e.g., video, movies and the like) services, are transmitted on networks.

A customer may wish to have access to multimedia content located at the customer's primary address, e.g., a home or a place of business, while travelling. However, the customer's entire library of multimedia content may not be available as it would be if the customer was physically at home. For example, the customer's multimedia content may comprise one or more videos, photos, music files, home surveillance data, and the like that are stored on a server at home.

In one embodiment, the current invention provides multimedia content on a mobile media center over a wireless network, e.g., a cellular network. A customer may request to access multimedia content stored at another location (e.g., the customer's home). For example, the customer may request to play the multimedia content, to receive updates of the multimedia content, and/or receive new multimedia content from the home location.

Figure 2:
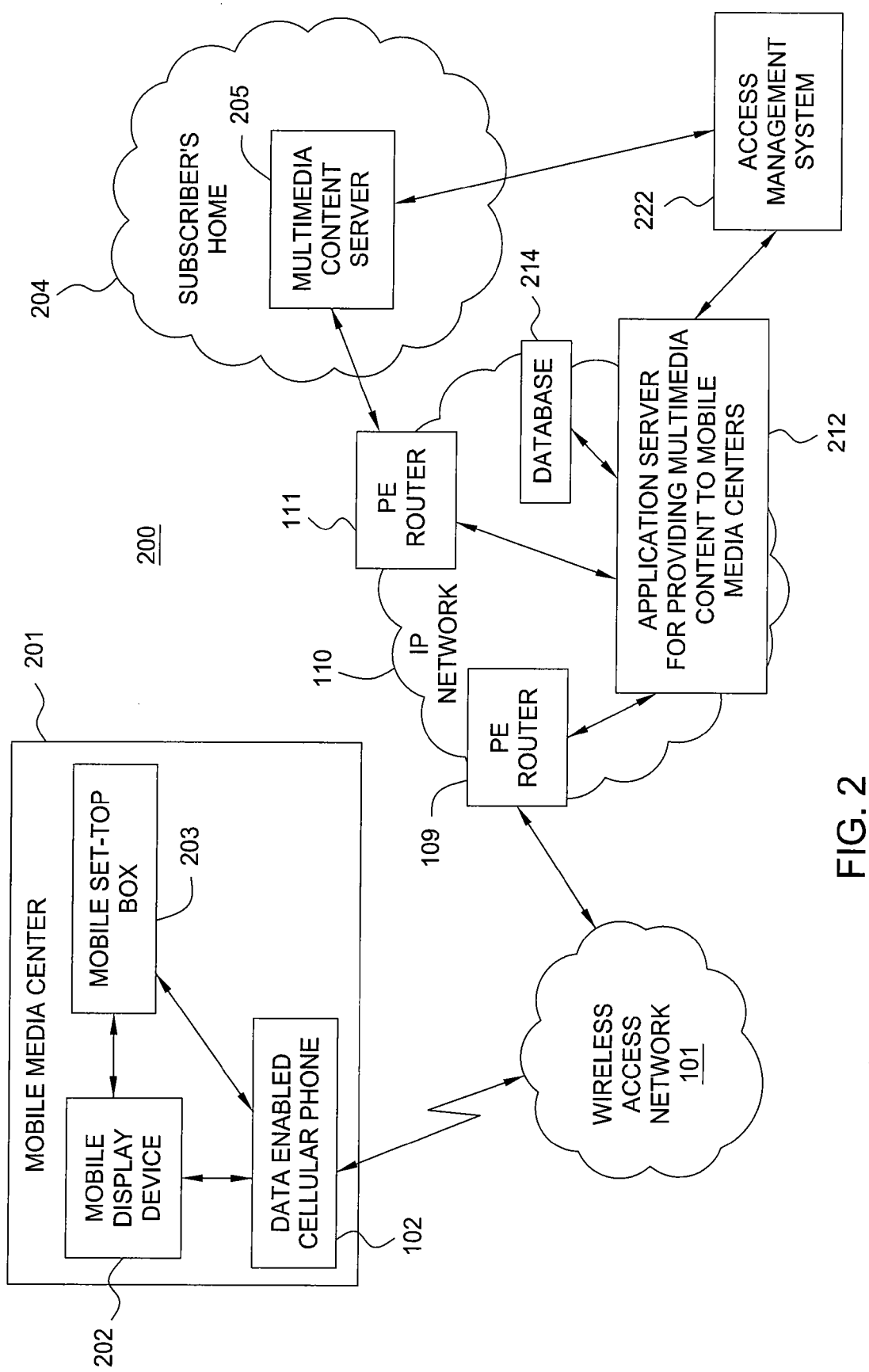
FIG. 2 illustrates an illustrative network of the current invention for providing multimedia content on a mobile media center.

FIG. 2 illustrates an exemplary network 200 in accordance with the current invention for providing multimedia content on a mobile media center. The exemplary network 200 comprises a mobile media center 201 communicating with an IP network 110 via a wireless access network 101 and PE router

109. Similarly, a multimedia content server 205 e.g., located at a subscriber's home 204 is communicating with the IP network 110 via the PE router 111. The IP network 110 may also include an application server 212 and a database 214.

In one embodiment, the mobile media center 201 comprises: a mobile display device 202, a mobile set-top box 203 and a data enabled cellular phone 102. The mobile media center 201 can be used by a customer to transfer, store and/or playback multimedia content while traveling, e.g., in a vehicle, train, and so on.

In one embodiment, the mobile set-top box 203 includes a memory for storing multimedia content (e.g. one or more hard drives), Input/Output (I/O) devices, and a processor. For example, the mobile set-top box 203 can be installed into a vehicle such as a car, a truck, a boat, a motorcycle, and the like.

In one embodiment, the data enabled cellular phone 102 is used to import or transfer multimedia content into the memory of the set-top box 203. For example, the data enabled cellular phone may be a Smartphone, a Personal Digital Assistant (PDA), etc. that is capable of communicating over a cellular network, for receiving and transmitting data from one or more networks, e.g., an IP network, a home network, etc. For example, the data enabled cellular phone 102 may serve as the primary connection tool to obtain multimedia content stored in a multimedia content server 205 deployed at the subscriber's home 204.

In one embodiment, the data enabled cellular phone 102 is also used to control the mobile set-top box 203 and mobile display device 202. For example, the data enabled cellular phone may have software and hardware needed to remotely control the set-top box and the display device, e.g., an infrared transmitter or an RF transmitter.

In one embodiment, the service provider may implement the current method for providing multimedia content to mobile media centers in an application server 212. For example, the service provider may enable customers to interact with application server 212 and request a multimedia content to be downloaded to their mobile media center 201. The application server 212 may store customer information, e.g., subscription information, preferences, etc., in the database 214. The application server 212 may gain access to the multimedia content server 205 via an access management system 222. For example, the access management system 222 may perform authentication to ensure that the request for multimedia access originated from the customer. For example, the authentication via the access management system 222 may require a password, an originating phone number associated with the data enabled cellular phone, a decryption key (if the requested multimedia content is encrypted), a voice signature, and the like.

In one embodiment, the customer is able to import multimedia content by communicating with a service provider via a wireless connection. For example, the customer may subscribe to a service for receiving multimedia content on a mobile media center 201 from a network service provider. The network service provider may implement the current method for providing multimedia content on a mobile media center in application server 212 and enable customers to access the service via a data enabled cellular telephone, e.g., cellular phone 102.

A customer may then send a request to access the multimedia content stored at another location (e.g., the customer's home or office 204) via his/her data enabled cellular phone 102. For example, the customer may communicate with application server 212 over the cellular network 101 and PE router 109 to request to play stored multimedia content, update stored multimedia content, and/or import new multimedia content from the multimedia content server 205.

In turn, the application server 212 may then receive the request from the customer for accessing multimedia content from the customer's multimedia content server. The current method may then perform an authentication for obtaining the requested multimedia content from the customer's multimedia content server 205. In one embodiment, the authentication comprises communicating with a gateway via an access management system 222. For example, the customer may allow access to the multimedia content server 205 only through a service provider that manages the customer's home network. Thus, the access to the multimedia content may have to be facilitated by the service provider managing the home network through the access management system 222. It should be noted that the service provider managing the home network may be a different service provider from the service provider who is providing the wireless access service on network 101.

In one alternate embodiment, the service provider for accessing multimedia content on a mobile media center and the service provider for managing access to content stored at another location, e.g., a customer's home, may be the same service provider. Hence, the server that provides access to the multimedia content may be able to gain access to the requested multimedia content directly. That is, without the necessity of gaining access via another service provider.

The method then obtains the multimedia content from the multimedia content server 205 and transmits or forwards the multimedia content to the customer's data enabled cellular phone 102. For example, the method may play stored multimedia content, update stored multimedia content, and/or import new multimedia content in accordance with the request.

In one embodiment, the requested multimedia content is streamed to the cellular phone for immediate viewing. For example, the customer may wish to watch the content as it is being transmitted to the mobile media center. For example, the multimedia content may be a security video for a home network. The customer may then view the multimedia content as it is being streamed by application server 212.

In one embodiment, the requested multimedia content is first transmitted to the data enabled cellular phone and then viewed. For example, the customer may wish to download pictures or movies stored at home. Alternatively, the customer may prefer to download the entire requested multimedia content first before viewing to facilitate various viewing functions. For example, viewing functions such as, fast-forwarding, rewinding, pausing, skipping, etc. may be performed with ease if the entire multimedia content is downloaded first.

In one embodiment, the method transmits the multimedia content to the mobile set-top box 203 via the data enabled cellular phone 102. For example, the customer may wish to store the multimedia content for later viewing. For example, the customer may wish to be connected to the cellular network only for the purpose of downloading the multimedia content. Once the customer has completed importing the multimedia content into the set-top box 203, the customer may view the multimedia content on the mobile display device 202 without the necessity for maintaining a connection to the cellular network 101. That is, once the desired multimedia content is fetched, the viewing may be performed independently.

In one embodiment, the above data enabled cellular phone may also have multimedia content previewing capability. For example, a customer may wish to browse through a library of multimedia content stored at another location prior to transferring a selected multimedia content from the library of multimedia content. For example, the data enabled cellular phone can be used to access an index for the library of multimedia content, where the index may comprise names of various multimedia content, or a preview (e.g., a short sequence of image frames) of each of the various multimedia content.

In one embodiment, the mobile set-top box may display the one or more multimedia content on a display screen of a vehicle. For example, the set-top box is installed in a manner to interact with a car's video display device (e.g., the car's entertainment system). In another example, the customer's vehicle may have other displays for other purposes, e.g., Global Positioning System (GPS) devices or navigation systems. The customer may then be able to operate a mobile set-top box that is capable of displaying content on existing display devices within the vehicle.

In one embodiment, the mobile set-top box is programmable by a user. For example, the customer may wish to program the set-top box such that the set-top box automatically obtains multimedia content from a home location according to a predetermined schedule. For example, the customer may wish to download content from a home location after a scheduled event has concluded, e.g., after a football game is finished. In other words, the multimedia content server 205 may have recorded the football game that can be retrieved at a later time by the data enabled cellular phone. In one embodiment, the set-top box is programmed by the user via the data enabled cellular phone. For example, the customer uses the cellular phone's remote control capability to program the mobile set-top box.

In one embodiment, the mobile set-top box has a predetermined home location, i.e., permanently installed at a location. For example, if the set-top box is installed within a vehicle, the customer may designate the garage in the customer's home location as the home location for the mobile set-top box.

In one embodiment, the mobile set-top box is able to determine whether it is at its home location. For example, the mobile set-top box may have a Global Positioning System (GPS). The set-top box may then be able to compare the GPS coordinates of its home location with the GPS coordinates of its current location to determine proximity to its home location.

In one embodiment, the mobile set-top box automatically obtains multimedia content when it is at its home location. For example, the set-top box 203 may automatically download the latest videos, pictures, etc. from the multimedia content server 205 when the car is parked in the garage of the customer's home 204. It should be noted that this alternate embodiment does not require the use of the data enabled cellular phone for obtaining the requested multimedia content. In other words, the mobile set-top box is implemented with a transceiver to communicate directly with the wireless access network 101.

Figure 3:
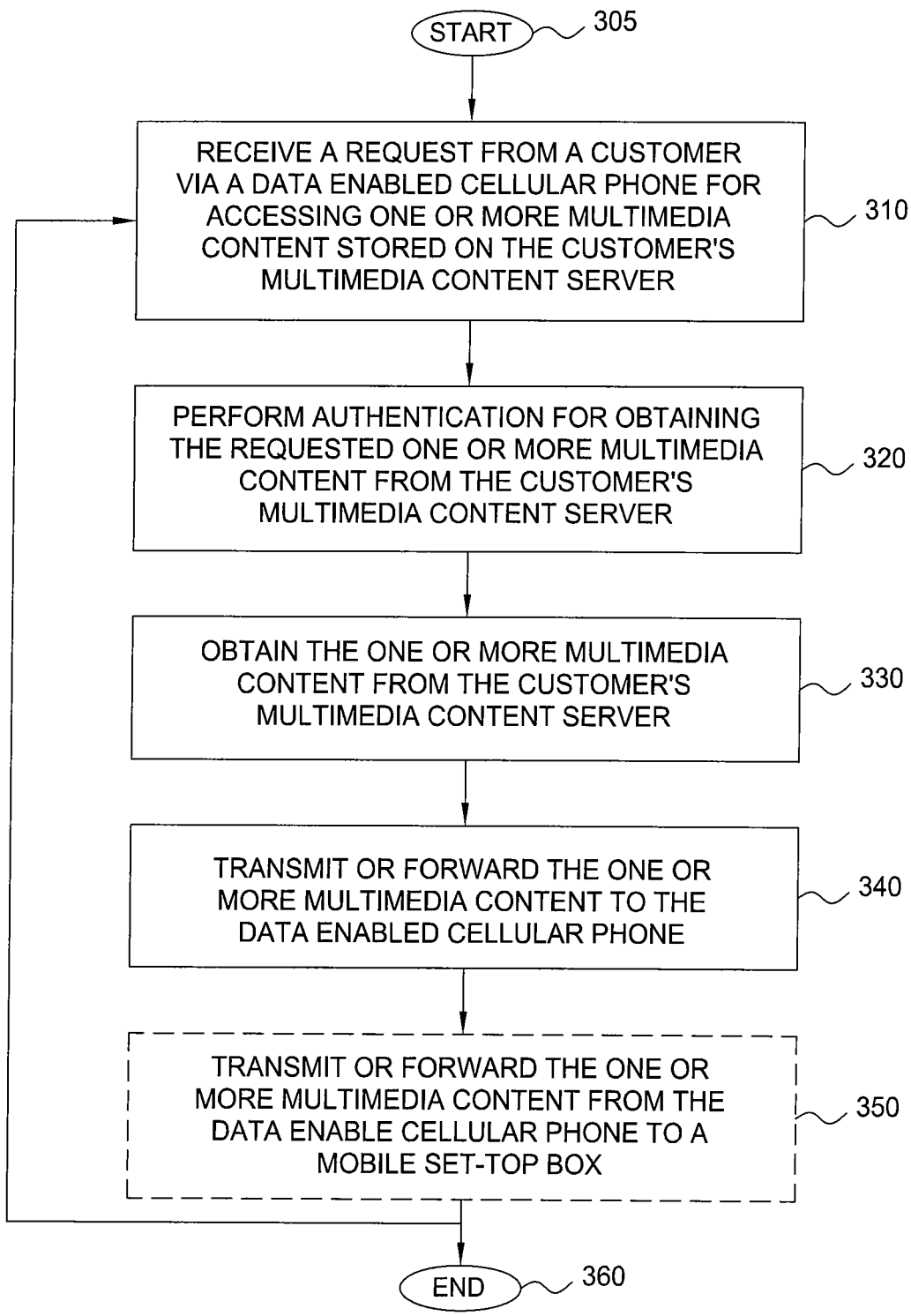
FIG. 3 illustrates a flowchart of a method for providing multimedia content on a mobile media center.

FIG. 3 illustrates a flowchart of a method 300 for providing multimedia content on a mobile media center. For example, one or more steps of method 300 can be performed by an application server. Method 300 starts in step 305 and proceeds to step 310.

In step 310, method 300 receives a request from a customer via a data enabled cellular phone for accessing one or more multimedia content stored on the customer's multimedia content server. For example, a customer may request for a multimedia content and provide the location of the content, e.g., the location of the multimedia content server or another device accessible via the multimedia content server.

In step 320, method 300 performs an authentication for obtaining the requested one or more multimedia content from the customer's multimedia content server. For example, the method communicates with an access management system to gain access to the customer's multimedia content server.

In step 330, method 300 obtains the one or more multimedia content from the customer's multimedia content server. For example, the method obtains the requested content from the multimedia content server at the customer's home (or any other locations where the customer's multimedia content server is deployed, e.g., an office, a place of business, and so on).

In step 340, method 300 transmits or forwards the one or more multimedia content to the data enabled cellular phone. For example, the method streams or downloads the requested multimedia content to the customer's data enabled cellular phone.

In optional step 350, method 300 transmits or forwards (wirelessly or via a wired connection, e.g., a cable or a port) the one or more multimedia content from the data enabled cellular phone to a mobile set-top box. For example, the method may stream or download the one or more multimedia content for storing the content in a set-top box for later viewing. The method then ends in step 360 or return to step 310 to continue receiving requests.

Those skilled in the art would realize that the service providers for the cellular service, for forwarding the multimedia content to the mobile media center and/or for providing access management of the multimedia content server may be the same service provider or different service providers. Thus, the above exemplary network is not intended to limit the implementation to any number of service providers.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
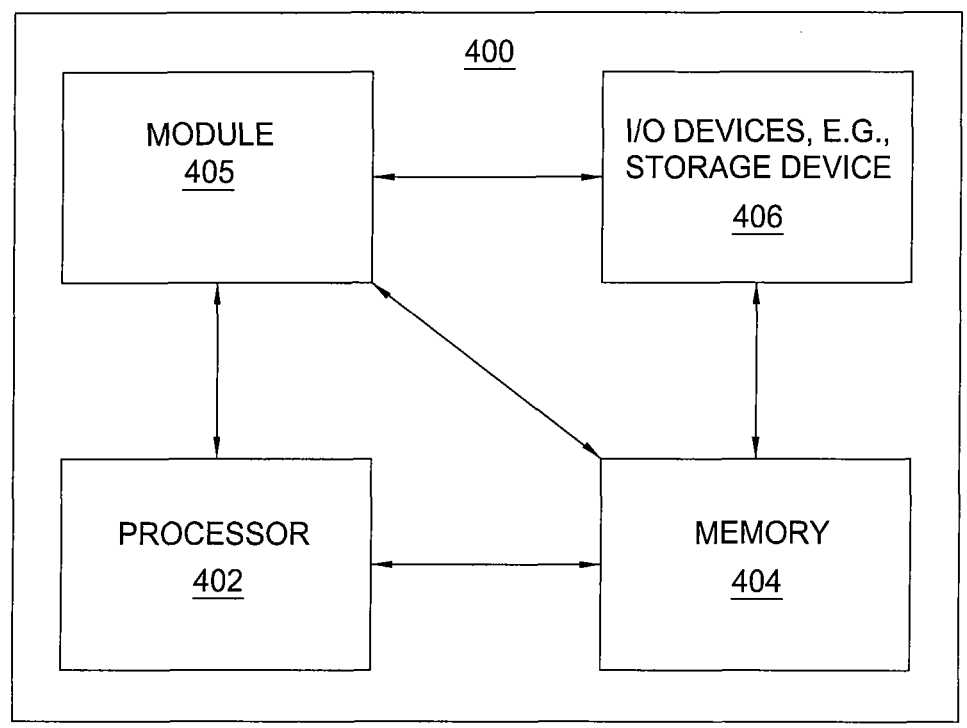
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing multimedia content on a mobile media center, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing multimedia content on a mobile media center can be loaded into memory 404 and executed by processor 402 to implement the functions as discussed above. As such, the present method 405 for providing multimedia content on a mobile media center (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing multimedia content, comprising:
    receiving, by a processor of an application server deployed in a service provider network, a request from a customer wirelessly via a data enabled cellular phone for accessing the multimedia content from a multimedia content server of the customer located in a customer premise;
    performing, by the processor, an authentication for obtaining the multimedia content from the multimedia content server;
    obtaining, by the processor, the multimedia content from the multimedia content server;
    transmitting, by the processor, the multimedia content to the data enabled cellular phone; and
    transmitting, via the processor, the multimedia content from the data enabled cellular phone to a mobile set-top box, wherein the mobile set-top box is deployed in a vehicle.

2. The method of claim 1, wherein the mobile set-top box is programmable.

3. The method of claim 1, wherein the mobile set-top box interacts with a display installed in the vehicle for displaying the multimedia content.

4. The method of claim 3, wherein the display installed in the vehicle is part of an entertainment system of the vehicle.

5. The method of claim 1, wherein the authentication comprises communicating with an access management system, wherein the access management system manages access to the multimedia content server.

6. The method of claim 1, wherein the data enabled cellular phone has a multimedia content previewing capability.

7. A non-transitory computer-readable medium storing a plurality of instructions which, when executed by a processor of an application server deployed in a service provider network, cause the processor to perform operations for providing multimedia content, the operations comprising:
    receiving a request from a customer wirelessly via a data enabled cellular phone for accessing the multimedia content from a multimedia content server of the customer located in a customer premise;
    performing an authentication for obtaining the multimedia content from the multimedia content server;
    obtaining the multimedia content from the multimedia content server;
    transmitting the multimedia content to the data enabled cellular phone; and
    transmitting the multimedia content from the data enabled cellular phone to a mobile set-top box, wherein the mobile set-top box is deployed in a vehicle.

8. The non-transitory computer-readable medium of claim 7, wherein the mobile set-top box is programmable.

9. The non-transitory computer-readable medium of claim 7, wherein the mobile set-top box interacts with a display installed in the vehicle for displaying the multimedia content.

10. The non-transitory computer-readable medium of claim 9, wherein the display installed in the vehicle is part of an entertainment system of the vehicle.

11. The non-transitory computer-readable medium of claim 7, wherein the authentication comprises communicating with an access management system, wherein the access management system manages access to the multimedia content server.

12. The non-transitory computer-readable medium of claim 7, wherein the data enabled cellular phone has a multimedia content previewing capability.

13. A method for providing multimedia content, comprising:
    receiving, by a processor of an application server deployed in a service provider network, a request from a customer wirelessly via a mobile set-top box for accessing the multimedia content from a multimedia content server of the customer located in a customer premise;
    performing, by the processor, an authentication for obtaining the multimedia content from the multimedia content server;
    obtaining, by the processor, the multimedia content from the multimedia content server; and
    transmitting, by the processor, the multimedia content to the mobile set-top box, wherein the mobile set-top box is deployed in a vehicle.

14. The method of claim 13, wherein the mobile set-top box has a predetermined home location.

15. The method of claim 14, further comprising:
    determining by the mobile set-top box when the mobile set-top box is at the predetermined home location; and
    automatically generating the request.

* * * * *